United States Patent
Goshima et al.

(10) Patent No.: US 7,316,138 B2
(45) Date of Patent: Jan. 8, 2008

(54) STEERING LOCK MECHANISM

(75) Inventors: Hirofumi Goshima, Aichi (JP);
Masanari Okuno, Aichi (JP)

(73) Assignee: Kabushiki Kaisha Tokai Rika Denki Seisakusho (JP)

( * ) Notice: Subject to any disclaimer, the term of this patent is extended or adjusted under 35 U.S.C. 154(b) by 0 days.

(21) Appl. No.: 11/510,546

(22) Filed: Aug. 25, 2006

(65) Prior Publication Data
US 2007/0068207 A1    Mar. 29, 2007

(30) Foreign Application Priority Data
Aug. 26, 2005   (JP) ............... 2005-246280

(51) Int. Cl.
*B60R 25/02* (2006.01)

(52) U.S. Cl. .......................... 70/186; 74/492

(58) Field of Classification Search .......... 70/182–186, 70/252; 74/492; 280/775, 777, 779
See application file for complete search history.

(56) References Cited

U.S. PATENT DOCUMENTS

| | | | |
|---|---|---|---|
| 1,180,802 A * | 4/1916 | Terry ........................... | 70/185 |
| 1,206,944 A * | 12/1916 | Terry ........................... | 70/185 |
| 1,268,137 A * | 6/1918 | Mailloux ...................... | 70/185 |
| 1,302,502 A * | 5/1919 | Boswell ........................ | 70/185 |
| 1,332,075 A * | 2/1920 | Newton ........................ | 70/185 |
| 1,345,828 A * | 7/1920 | Boswell ........................ | 70/185 |
| 1,353,408 A * | 9/1920 | McCormick .................. | 70/185 |
| 1,359,213 A * | 11/1920 | Welch .......................... | 70/183 |
| 1,360,674 A * | 11/1920 | Olbon .......................... | 70/185 |
| 1,360,692 A * | 11/1920 | Scott ............................ | 70/183 |
| 1,374,769 A * | 4/1921 | Schicke ........................ | 70/299 |
| 1,414,991 A * | 5/1922 | Reuseus ....................... | 70/211 |
| 1,417,603 A * | 5/1922 | Scott ............................ | 70/185 |
| 1,428,089 A * | 9/1922 | Thomas ........................ | 70/183 |
| 1,436,585 A * | 11/1922 | Cornell ......................... | 70/183 |
| 1,456,922 A * | 5/1923 | Flynn ........................... | 70/186 |
| 4,318,288 A * | 3/1982 | Rifat ............................ | 70/252 |
| 6,076,382 A | 6/2000 | Naganuma | |

FOREIGN PATENT DOCUMENTS

JP      2005-162053     6/2005

* cited by examiner

*Primary Examiner*—Lloyd A. Gall
(74) *Attorney, Agent, or Firm*—Fulwider Patton LLP

(57) ABSTRACT

A steering lock mechanism that is compact and effectively prevents vehicle theft. The steering lock mechanism includes a steering column for rotatably accommodating a steering shaft. The steering column is sandwiched by a lock body and a bracket, which are fastened to each other. A lock bar accommodated in the lock body restricts rotation of the steering shaft. A hinged fastening portion, which fastens the bracket to the lock body, includes a pin, a pin support arranged on the lock body to support the pin when the pin is inserted into the pin support in a partially exposed state, a hook arranged on the bracket and hooked to the exposed part of the pin, and a stopper, arranged on the bracket or the body, for preventing the hook from being unhooked from the pin.

9 Claims, 8 Drawing Sheets

STEERING LOCK MECHANISM

BACKGROUND OF THE INVENTION

The present invention relates to a steering lock mechanism for restricting rotation of a steering wheel shaft.

A steering lock mechanism is often used in vehicles to prevent theft. In the prior art, a typical steering lock mechanism includes a lock bar and a socket, which is formed in the outer surface of a steering shaft that is rotated by a steering wheel. The lock bar is fitted into the socket to restrict rotation of the steering shaft.

More specifically, the steering shaft is retained in a cylindrical steering column. A lock body, which accommodates the lock bar, and a bracket are arranged on the steering column so as to sandwich the steering column. A flange extends from each end of the lock body and the bracket. The flanges of the lock body contact the flanges of the bracket. A threaded hole is formed in each flange of the lock body. A bolt hole is formed in each flange of the bracket in alignment with the threaded hole of the corresponding lock body flange. A bent portion, which is bent away from the lock body in the axial direction of the lock bar, is formed at an edge of each bracket flange to provide space for a bolt. A bolt is inserted through each bolt hole of the bracket and mated with the corresponding threaded hole of the lock body so as to fasten the bracket to the lock body (refer to, for example, Japanese Laid-Open Patent Publication No. 2005-162053).

In recent vehicles, there is a tendency of lowering the location of the instrument panel to improve visibility. This has reduced space for the steering lock mechanism. Thus, there is a demand for smaller steering lock mechanisms.

Accordingly, referring to FIG. 11, a hinged structure 71 has been employed in the prior art to fasten a bracket 53 to a lock body 67. More specifically, the hinged structure 71 includes a pin support 72 for supporting a pin 76. The bracket 53 includes a hook 73, which is hooked to the pin 76. A fastening portion 81, which includes a flange 83, is defined opposite to the hinged structure 71. A bolt 86 is inserted through the flange 83 to fasten the bracket 53 to the lock body 67. As viewed in FIG. 11, to provide space-for the bolt 86, the upper surface 83a of the flange 83 is located at level L1, which is higher than the upper surface 72a of the pin support 72 located at level L2. Accordingly, the hinged structure 71 provides extra space L, which corresponds to the difference between levels L1 and L2.

However, with the above steering lock mechanism of the prior art, when a lock bar 70 is inserted into a socket 63 to lock and restrict rotation of a steering shaft 59 as shown in the state of FIG. 11, forcible rotation of the steering wheel (not shown) would apply a strong torque to the steering shaft 59. This may flex and displace the steering shaft 59 in the direction shown by arrow X.

In such a case, stress would also be applied to the bracket 53 in the direction shown by arrow X. As a result, stress would be applied to the hook 73 of the bracket 53 in the direction of arrow Y as shown in FIG. 12A. This may deform the bracket 53 as shown in FIG. 12B. In this state, the application of further torque by the steering wheel would detach the bracket 53 from the lock body 67 and release the lock bar 70 from the steering shaft 59. Such strong torque may be applied to forcibly enable rotation of the steering shaft in an attempt to steal the vehicle.

SUMMARY OF THE INVENTION

The present invention provides a steering lock mechanism, which is compact and functions effectively to prevent vehicle theft.

One aspect of the present invention is a steering lock mechanism including a steering shaft. A steering column accommodates and rotatably supports the steering shaft. A lock body covers part of the steering column. A lock member is movably accommodated in the lock body and formed to enable restriction of rotation of the steering shaft. A bracket is fastened to the lock body so as to cover another part of the steering column, with the bracket and the lock body sandwiching the steering column. A hinged fastening portion fastens the bracket to the lock body. The hinged fastening portion includes a pin. A pin support, arranged on the lock body, supports the pin. The pin is inserted into the pin support in a partially exposed state. A hook is arranged on the bracket and hooked to the exposed part of the pin. A stopper, arranged on the bracket or the body, prevents the hook from being unhooked from the pin.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
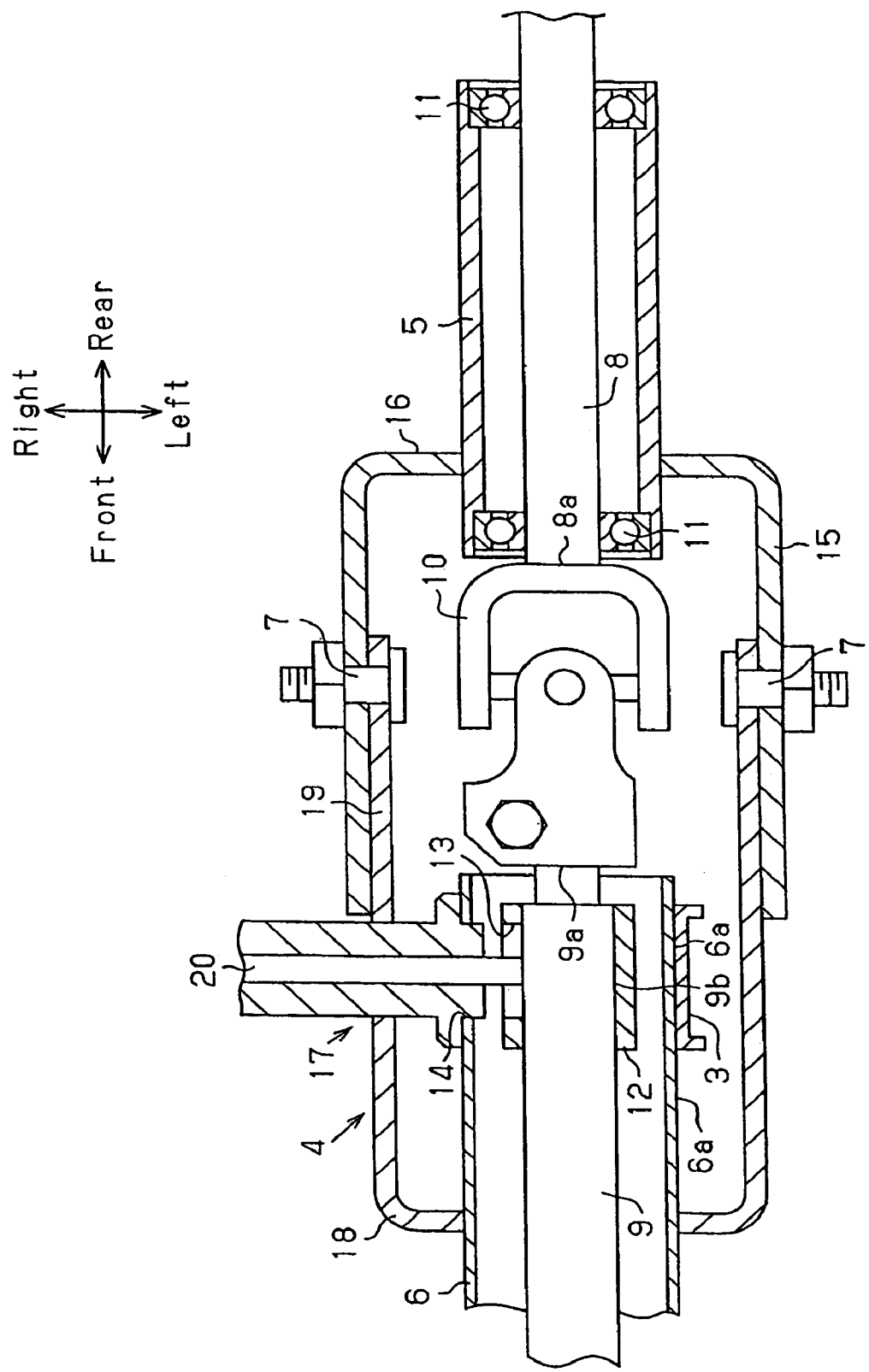
FIG. 1 is a cross-sectional view of a steering device according to a first embodiment of the present invention.

A steering lock mechanism 1 according to a first embodiment of the present invention will now be described with reference to the drawings. FIG. 1 shows the cross-section of the steering lock mechanism 1 when viewed from above with the left side of the drawing corresponding to the frontward side of the vehicle. A support bracket 4 is fixed to a vehicle body at a lower surface of a dashboard (not shown). Left and right side pins 7 pivotally support a tiltable bracket 15 on the support bracket 4. The tiltable bracket 15 includes a rear wall 16. An upper steering column 5 extends through the middle portion of the rear wall 16. The upper steering column 5 is welded and fixed to the rear wall 16. Front and rear bearings 11 rotatably support an upper steering shaft 8 in the upper steering column 5.

The support bracket 4 includes a front wall 18. A lower steering column 6, which extends through the middle portion of the front wall 18, is welded and fixed to the front wall 18. A lower steering shaft 9 is rotatably supported in the lower steering column 6. A universal joint 10 couples a front end 8a of the upper steering shaft 8 to a rear end 9a of the lower steering shaft 9. The universal joint 10 freely transmits torque between the upper steering shaft 8 and the lower steering shaft 9 regardless of the tilting of the upper steering shaft 8 about the side pins 7.

A lock collar 12 is fixed to the outer surface 9b of the lower steering shaft 9 in the lower steering column 6. The lock collar 12 has a socket 13, which is elongated in the axial direction of the steering shaft 9.

An insertion hole 14 extends through the lower steering column 6 facing towards the socket 13. The insertion hole 14 receives and supports part of a lock body 17. The lock body 17 projects rightward out of a side wall 19 of the support bracket 4. A lock bar 20, which functions to restrict rotation of the lower steering shaft 9, is movably supported in the lock body 17. An ignition key (not shown) is operated to push the lock bar 20 against the lock collar 12. Further, the lock bar 20 enters the socket 13 when the socket 13 is located at a position facing towards the lock bar 20.

A bracket 3 is arranged on the lower steering column 6 opposite to the lock body 17 so as extend around part of the outer surface 6a of the lower steering column 6. The bracket 3 is fastened to the lock body 17 so that the lower steering column 6 is sandwiched between the bracket 3 and the lock body 17 (refer to FIG. 3). The bracket 3 is formed by pressing a steel plate.

Figure 2:
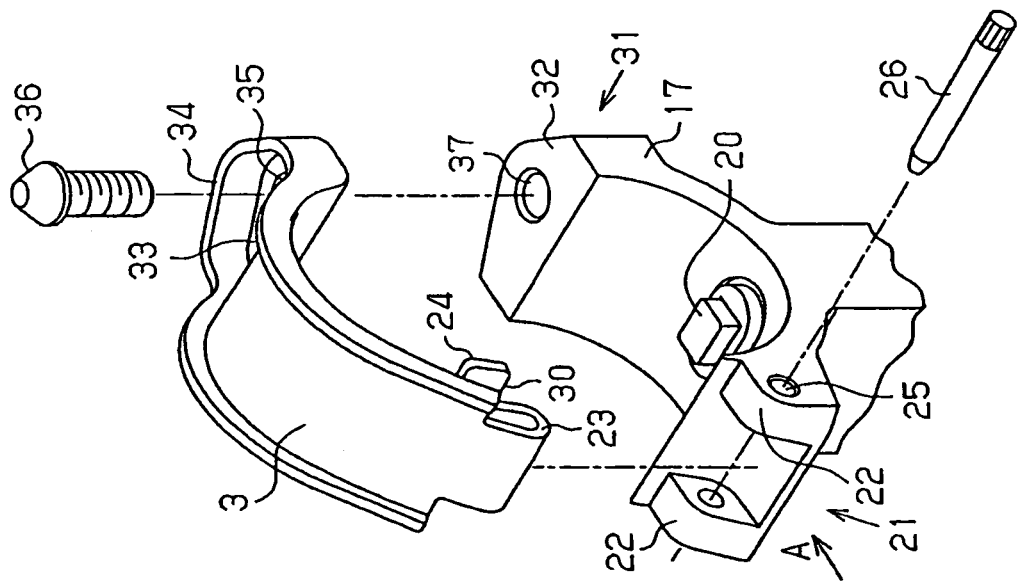
FIG. 2 is an exploded perspective view showing a steering lock mechanism of the first embodiment.
Figure 3:
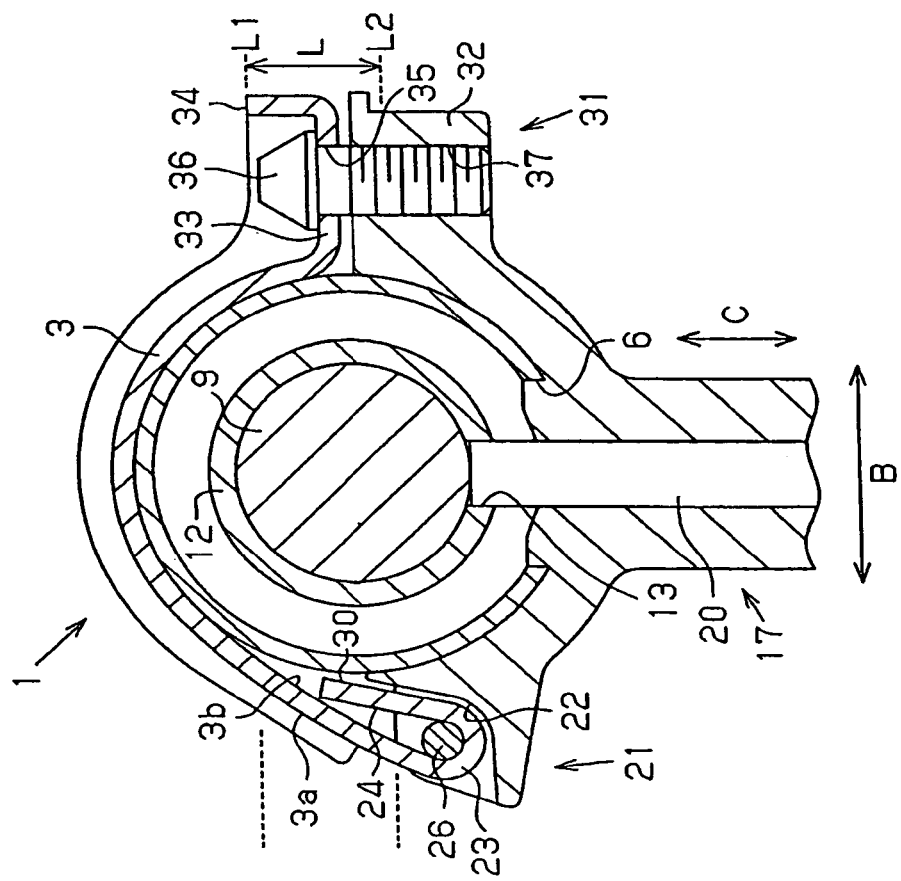
FIG. 3 is a cross-sectional view of the steering lock mechanism of the first embodiment.

The structure for attaching the lock body 17 to the bracket 3 will now be discussed. FIG. 2 is an exploded perspective view of a steering lock mechanism 1 shown in FIG. 1. FIG. 3 is a cross-sectional diagram of the steering lock mechanism 1.

As shown in FIGS. 2 and 3, the bracket 3 and the lock body 17 are fastened at fastening portions 21 and 31. More specifically, the fastening portion 31 includes a flange 32, which is formed on the lock body 17, and a threaded hole 37, which is formed in the flange 32. Further, the fastening portion 31 includes a flange 33, which is formed on the bracket 3, and a bolt hole 35, which is formed in the flange 33. The bolt hole 35 is in alignment with the threaded hole 37 of the lock body 17. A bolt 36 is inserted through the bolt hole 35 and mated with the threaded hole 37 to fasten the bracket 3 to the lock body 17.

Figure 4:
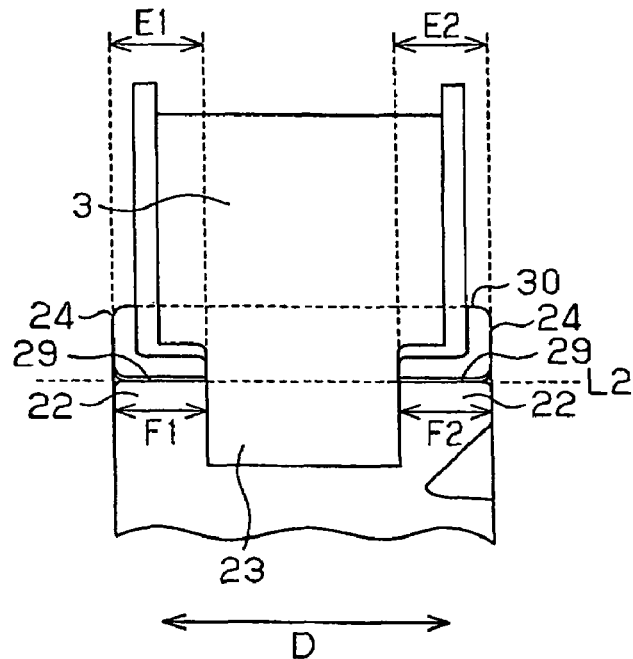
FIG. 4 is a front view showing the steering lock mechanism of the first embodiment.
Figure 5:
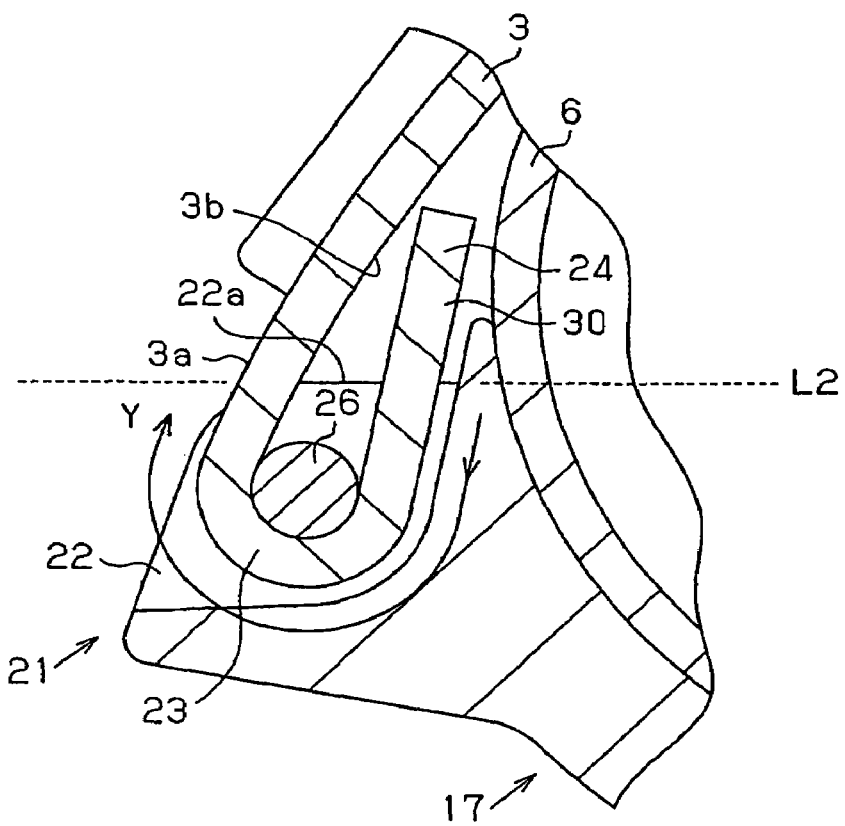
FIG. 5 is an enlarged view partially showing a fastening portion of a bracket and lock body in the steering lock mechanism of the first embodiment.

The features of the steering lock mechanism 1, or the fastening portion 21, will now be described in detail. FIG. 4 is a front view showing the steering lock mechanism 1 in the direction indicated by arrow A in FIG. 2. FIG. 5 is an enlarged view partially showing the fastening portion 21 of the bracket 3 and lock body 17.

Referring to FIGS. 2 to 5, the fastening portion 21 includes pin supports 22, which are formed on the lock body 17. The pin supports 22, which have lengths F1 and F2, each include a pin hole 25 for insertion of a pin 26. The fastening portion 21 further includes a hook 23, which is formed by bending the bracket 3. The hook 23 is hooked to the pin 26. The fastening portion 21 is formed by a hinged structure in which the hook 23 of the bracket 3 is hooked to the pin 26.

A stopper 30, which includes extensions 24, extend from the hook 23 toward the inner surface 3b of the bracket 3 to prevent the hook 23 from being unhooked from the pin 26. Referring to FIG. 4, the extensions 24, which have lengths E1 and E2, extend from the hook 23 in the axial direction of the pin 26 (i.e., in the directions indicated by arrow D). Abutment portions 29 are defined on the pin supports 22 in correspondence with the extensions 24. The total length E of the extensions (E=E1+E2) is substantially equal to the total length F (F=F1+F2) of the pin supports 22 at the abutment portions 29. As shown in FIG. 4, the extensions 24 have rectangular forms.

The lengths E1 and E2 of the left and right extensions 24 in the axial direction of the pin 26, as viewed in FIG. 4, are about the same. However, the extensions 24 may have different lengths E1 and E2. In such a case, the length E1 of the left extension 24b is generally the same as the length F1 of the abutment portion 29 of the corresponding pin support 22, and the length E2 of the right extension 24b is generally the same as the length F2 of the abutment portion 29 of the corresponding pin support 22.

Figure 11:
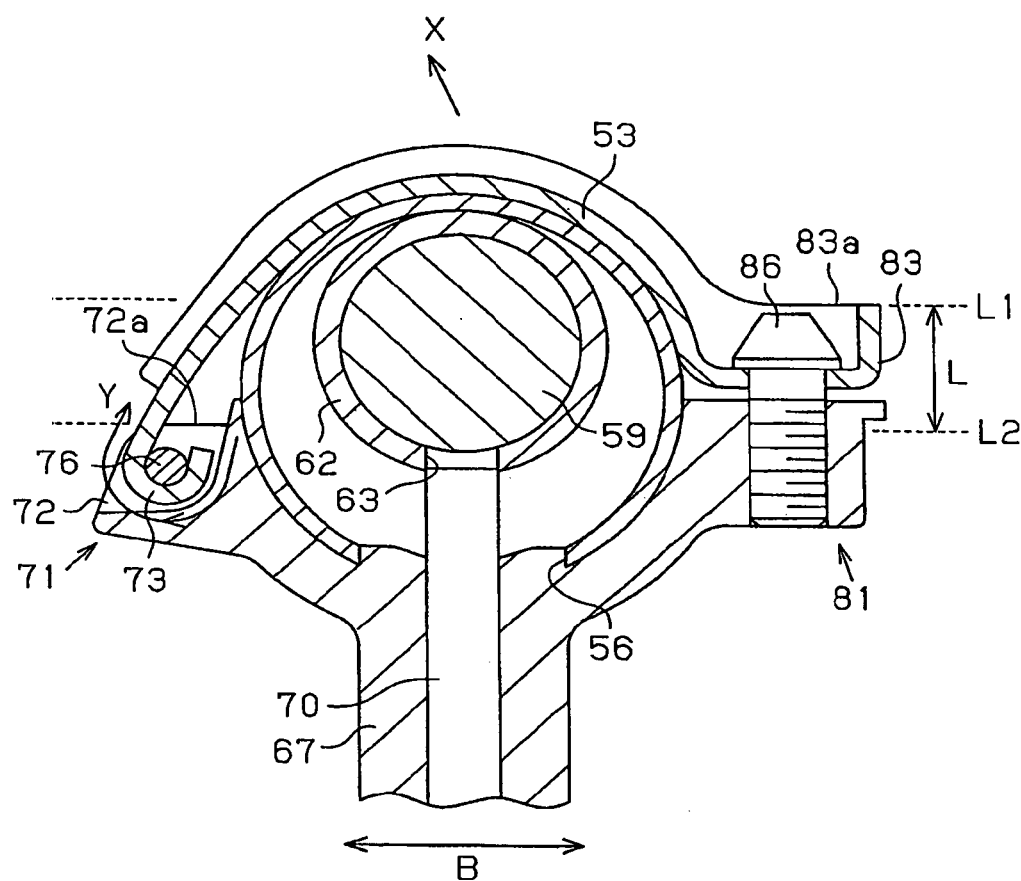
FIG. 11 is a cross-sectional view of a prior art steering lock mechanism showing the application of stress during the rotation of a steering shaft.
Figure 12A:
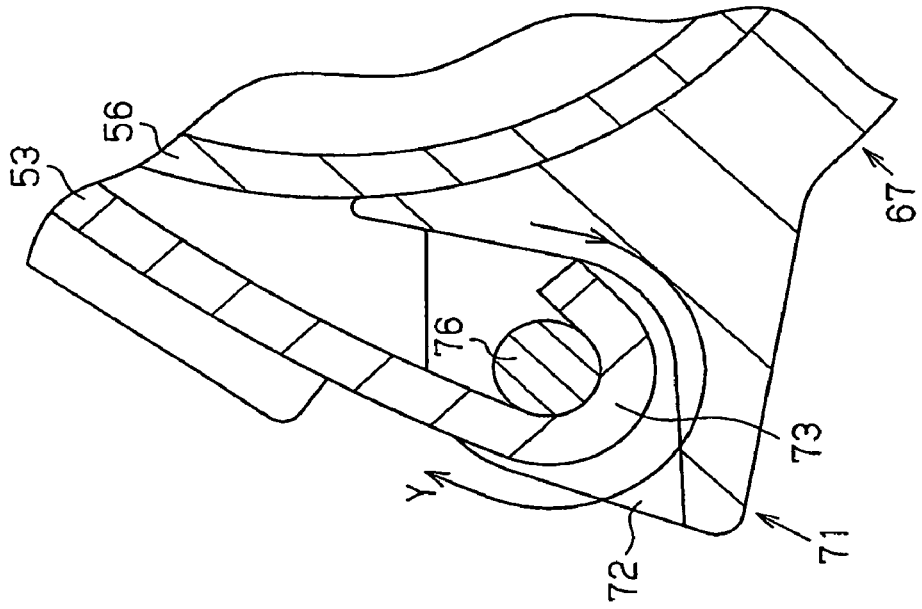
FIG. 12A is a enlarged view partially showing the prior art steering lock mechanism before bracket deformation.
Figure 12B:
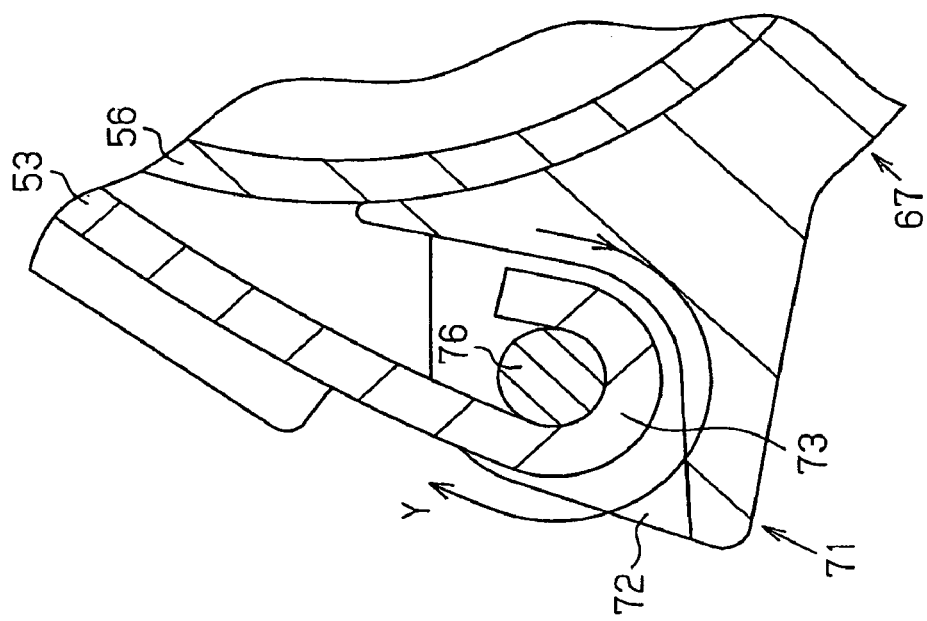
FIG. 12B is an enlarged view partially showing the prior art steering lock mechanism after bracket deformation.

Referring to FIG. 11, in the prior art, when the ignition key is removed from the steering lock mechanism and the lock bar 70 enters the socket 63, rotation of the steering shaft 59 is restricted. In this state, if the steering wheel (not shown) is forcibly rotated, a strong torque would be applied to the steering shaft 59. This may flex and displace the steering shaft 59 in the direction shown by arrow X. In such a case, stress would also be applied to the bracket 53 in the direction shown by arrow Y. As a result, stress would be applied to the hook 73 of the bracket 53 in the direction of arrow Y and deform the bracket 53 as shown in FIG. 12B.

However, with the steering lock mechanism 1 of the first embodiment, if stress is applied to the hook 23 in the direction of arrow Y, the extensions 24 of the bracket 3 would abut against upper surfaces 22a of the pin supports 22 at a location corresponding to level L2, as viewed in FIGS. 4 and 5. This prevents the hook 23 from being deformed even if stress, which may otherwise unhook the hook 23 from the pin 26, is applied to the hook 23. As a result, even if a strong torque is applied to the steering wheel, the bracket 3 would not be detached from the lock body 17. Hence, the lock bar 20 would continue to lock and restriction rotation of the lower steering shaft 9.

The steering lock mechanism 1 of the first embodiment has the advantages described below.

(1) The hinged fastening portion 21 includes the stopper 30 with the extensions 24, which prevent the hook 23 from being unhooked from the pin 26. Accordingly, even if a strong torque is applied to the lower steering shaft 9 when rotation of the lower steering shaft 9 is restricted, the hook 23 remains hooked to the pin 26, and the bracket 3 is prevented from being released from the lock body 17. Thus, the lock bar 20 would not be removed from the socket 13 of the lower steering shaft 9, and the lock bar 20 would continue to restrict rotation of the lower steering shaft 9. As a result, the steering lock mechanism 1 would function to effectively prevent vehicle theft when strong torque is applied to unlock the steering shaft.

(2) The fastening portion 21 for fastening the bracket 3 to the lock body 17 includes the pin 26, the pin supports 22 arranged on the lock body 17 for insertion of the pin 26, and the hook 23 arranged on the bracket 3 and hooked to the pin 26. Accordingly, the fastening portion 21 forms a hinged structure for hooking the hook 23 of the bracket 3 to the pin 26. The hinged fastening portion 21 provides extra space L in comparison with the bolted fastening portion 31, which uses the bolt 36 to fasten the bracket 3 to the lock body 17. More specifically, as viewed in FIG. 3, to provide space for the bolt 36, in the bolted fastening portion 31, the upper surface 34 of the flange 33 is located at level L1, which is higher than the upper surface of the pin support 22 located at level L2. This reduces the space occupied by the steering lock mechanism 1 and enables the steering lock mechanism 1 to be compact.

(3) The stopper 30, which includes the extensions 24, extends from the hook 23 toward the inner surface 3b of the bracket 3. If torque is applied to the lower steering shaft 9 when rotation of the lower steering shaft 9 is restricted, the extensions 24 abut against the pin supports 22. In such a case, the abutment of the extensions 24 against the pin supports 22 restricts displacement of the hook 23 of the bracket 3 even when the hook 23 receives stress applied about the pin 26 that would otherwise deform the hook 23 and unhook the hook 23 from the pin 26. Accordingly, the extensions 24 prevent deformation of the hook 23 and keeps the hook 23 hooked to the pin 26. Further, the stopper 30, which includes the extensions 24, is easily formed just by extending the hook 23 towards the inner surface 3b of the bracket 3. Thus, with a simple structure, the steering lock mechanism 1 functions to effectively prevent vehicle theft when a strong torque is applied to unlock the steering shaft.

(4) The total length E of the extensions 24 in the axial direction of the pin 26 is generally the same as the total length F of the abutment portions 29 defined on the corresponding pin supports 22 of the lock body 17. Accordingly, if torque is applied to the lower steering shaft 9 when rotation of the lower steering shaft 9 is restricted, the extensions 24 and the pin supports 22 efficiently disperse the stress applied to the hook 23. This further effectively prevents deformation of the hook 23 and keeps the bracket 3 fastened to the lock body 17.

(5) The bracket 3 is produced by pressing a steel plate, which has high strength. Thus, the material of the bracket 3 resists deformation resulting from stress. Accordingly, the bracket 3 may be thin so as to reduce the size of the steering lock mechanism 1. Further, if torque is applied to the lower steering shaft 9 when rotation of the lower steering shaft 9 is restricted, the bracket 3 resists deformation and prevents deformation of the hook 23. This prevents the hook 23 from being unhooked from the pin 26 and further effectively prevents the bracket 3 from being detached from the lock body 17.

Figure 8:
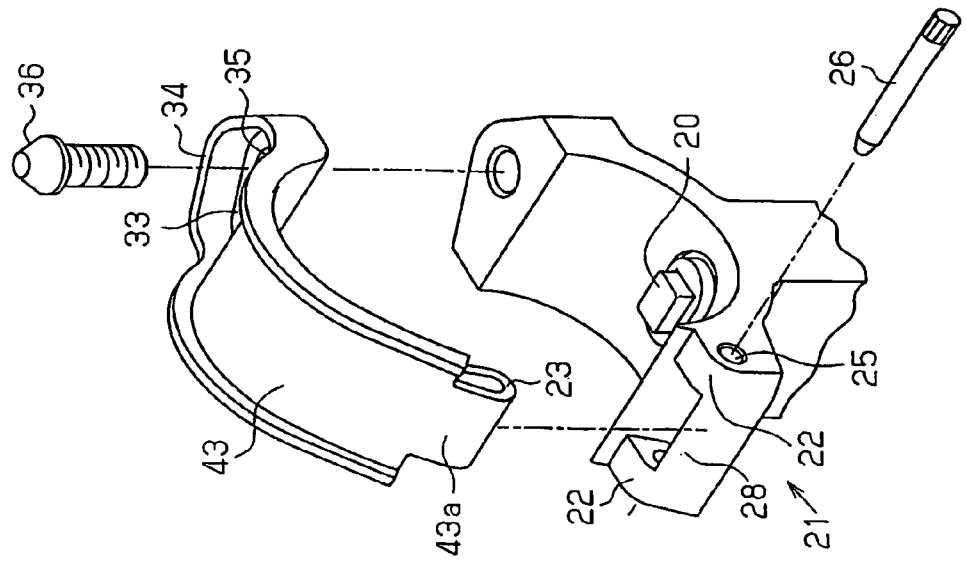
FIG. 8 is a perspective view showing a bracket and lock body of a steering lock mechanism according to a second embodiment of the present invention.

A steering lock mechanism 1 according to a second embodiment of the present invention will now be discussed. FIG. 8 is a perspective view showing a bracket 43 and a lock body. To avoid redundancy, like or same reference numerals are given to those components that are the same as the corresponding components of the first embodiment and will not be described in detail. In the second embodiment, the structure of the steering device is the same as that shown in FIG. 1. Further, the structure of the steering lock mechanism 1 is the same as that shown in FIGS. 2 to 5 except for the bracket 3 and the lock body 17 and will thus not be described in detail.

As shown in FIG. 8, a stopper 28 for preventing the hook 23 from being unhooked from the pin 26 is formed on the fastening portion 21. More specifically, the stopper 28 is formed integrally with the pin supports 22 so as to be arranged near the hook 23 facing towards the outer surface 43a of the bracket 43. When the lower steering shaft 9 is locked and its rotation is restricted, the stopper 28 comes into contact with the hook 23 when torque is applied to the lower steering shaft 9.

Due to such a structure of the steering lock mechanism 1, the stopper 28 contacts and prevents deformation of the hook 23 if torque is applied to the lower steering shaft 9 when the rotation of the lower steering shaft 9 is restricted.

In addition to advantages (1), (2), and (5) of the first embodiment, the steering lock mechanism 1 has the advantage described below.

(6) The stopper 28 contacts and prevents displacement of the hook 23 even when torque is applied to the lower steering shaft 9 and stress is applied to the hook 23 in the direction indicated by arrow Y in FIG. 5. This prevents the hook 23 from being unhooked from the pin 26 and keeps the bracket 43 fastened to the lock body 17.

Figure 9:
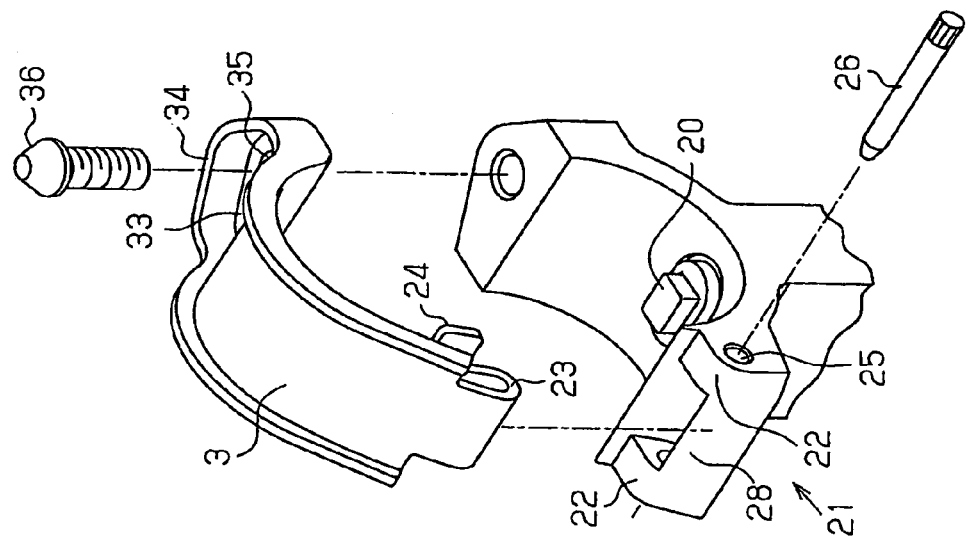
FIG. 9 is a perspective view showing a modification of the bracket and lock body in the steering lock mechanism of the second embodiment.

As shown in FIG. 9, the bracket 3, which includes the extensions 24, may be used in lieu of the bracket 43. In such a case, the second embodiment would also have advantages (3) and (4) of the first embodiment. Thus, the steering lock mechanism 1 functions to further effectively prevent vehicle theft when strong torque is applied to unlock the steering shaft.

Figure 10:
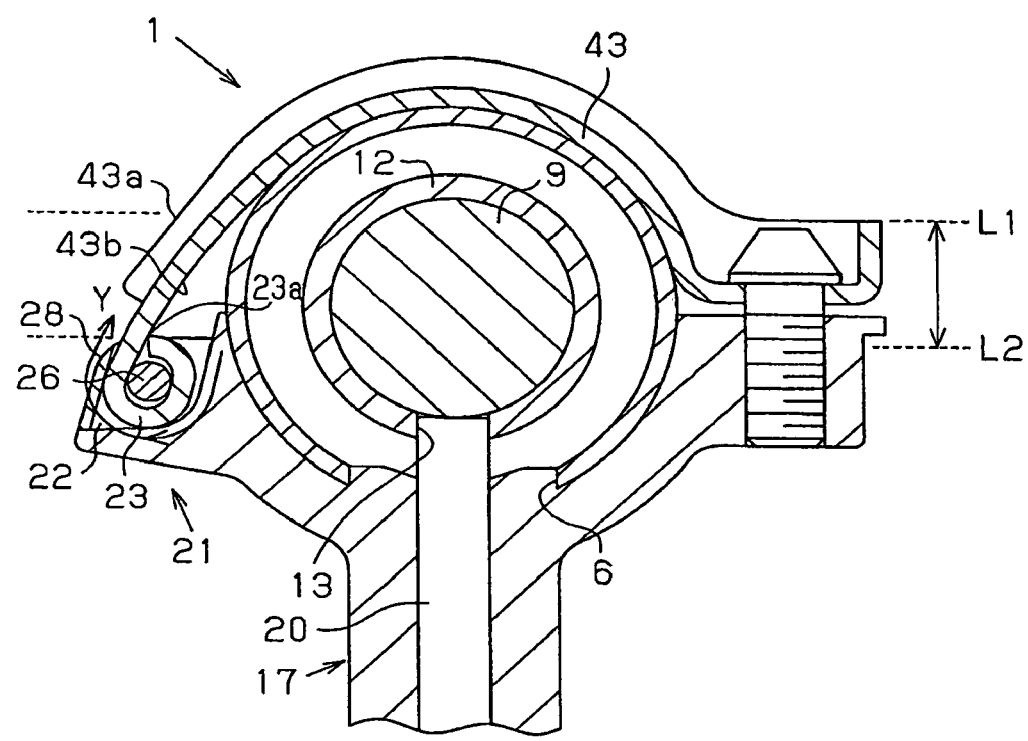
FIG. 10 is a cross-sectional view showing a modification in the steering lock mechanism of the second embodiment.

Further, as shown in FIG. 10, the hook 23 of the bracket 43 may be wound around the pin 26. Together with the stopper 28, this would further make it difficult for the hook 23 to be unhooked from the pin 26. Thus, the steering lock mechanism 1 functions to further effectively prevent vehicle theft when a strong torque is applied to unlock the steering shaft. In this case, by welding or bonding the distal portion 23a of the hook 23, which is wound around the pin 26, to the inner surface 43b of the bracket 43, the hook 23 would further resist deformation during the application of stress. Accordingly, this would further effectively lower the possibility of the hook 23 being unhooked from the pin 26.

It should be apparent to those skilled in the art that the present invention may be embodied in many other specific forms without departing from the spirit or scope of the invention. Particularly, it should be understood that the present invention may be embodied in the following forms.

In the first embodiment, the extensions 24 are generally rectangular. However, the shape of the extensions 24 is not restricted and the extensions 24 may have other shapes, such as a trapezoidal shape.

Figure 6:
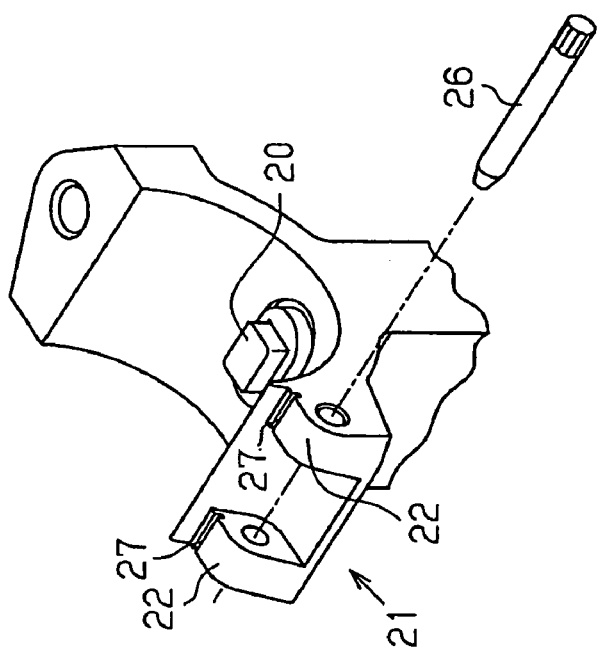
FIG. 6 is a perspective view showing a modification of the lock body in the first embodiment.

As shown in FIG. 6, grooves 27 may be formed in the pin supports 22 to receive the corresponding extensions 24. In this structure, when fastening the bracket 3 to the lock body 17, the extensions 24 are fitted into the grooves 27 so as to ensure that the extensions 24 are fixed to the pin supports 22. This further effectively prevents the hook 23 from being unhooked from the pin 26 and keeps the bracket 3 fastened to the lock body 17.

Figure 7:
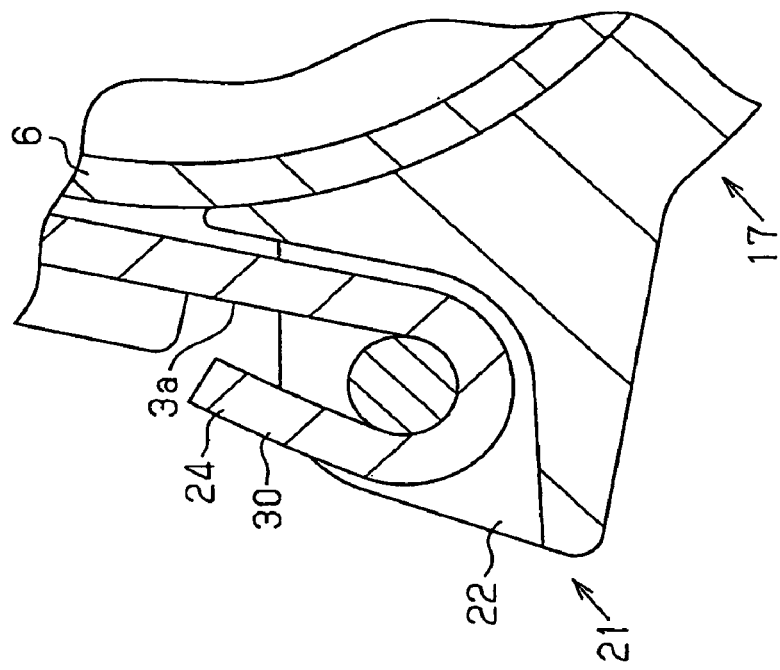
FIG. 7 is a cross-sectional view showing a further modification of the lock body in the first embodiment.

In the first embodiment, the hook 23 is bent toward the inner surface 3b of the bracket 3. However, as shown in FIG. 7, the hook 23 may be bent toward the outer surface 3a of the bracket 3. In this case, the same advantages as the first embodiment may be obtained by extending the stopper 30, which includes the extensions 24, toward the outer surface 3a for abutment with the pin supports 22.

In the second embodiment, it is preferred that the stopper 28 and the hook 23 be in contact with each other when the bracket 43 is fastened to the lock body 17. This prevents deformation of the hook 23 with the stopper 28 and ensures that displacement of the hook 23 is restricted.

In the second embodiment, the stopper 28 is formed integrally with the pin supports 22. However, the stopper 28 may be an independent component that is welded to the lock body 17 where it would come into contact with the hook 23 when torque is applied to the lower steering shaft 9. Such a structure would also have advantage (6) of the second embodiment.

The present examples and embodiments are to be considered as illustrative and not restrictive, and the invention is not to be limited to the details given herein, but may be modified within the scope and equivalence of the appended claims.

What is claimed is:

1. A steering lock mechanism comprising:
    a steering shaft;
    a steering column for accommodating and rotatably supporting the steering shaft;
    a lock body for covering part of the steering column;
    a lock member movably accommodated in the lock body and formed to enable restriction of rotation of the steering shaft;
    a bracket fastened to the lock body so as to cover another part of the steering column, with the bracket and the lock body sandwiching the steering column; and
    a hinged fastening portion for fastening the bracket to the lock body, the hinged fastening portion including:
        a pin;
        a pin support, arranged on the lock body, for supporting the pin, the pin being inserted into the pin support in a partially exposed state;
        a hook arranged on the bracket and hooked to the exposed part of the pin; and
        a stopper, arranged on the bracket or the body, for preventing the hook from being unhooked from the pin,
    wherein the bracket has an inner surface facing towards the steering column, and the stopper is formed to extend from the hook towards the inner surface of the bracket so as to prevent the hook from being unhooked from the pin by abutting against the pin support when torque is applied to the steering shaft while the lock member is restricting rotation of the steering shaft.

2. The steering lock mechanism according to claim 1, wherein the stopper includes an extension extending from the hook in the axial direction of the pin and being abuttable against the pin support.

3. The steering lock mechanism according to claim 2, wherein the extension has substantially the same length as the pin support in the axial direction of the pin.

4. The steering lock mechanism according to claim 1, wherein the pin support includes a groove for receiving the stopper when the bracket is fastened to the lock body.

5. The steering lock mechanism according to claim 1, wherein a second stopper is arranged on the lock body and faces toward the bracket when the bracket is fastened to the lock body.

6. The steering lock mechanism according to claim 5, wherein the second stopper is formed integrally with the pin support.

7. The steering lock mechanism according to claim 1, wherein the bracket has an inner surface facing towards the steering column and an opposite outer surface facing away from the steering column, the stopper including:
    a first stopper arranged on the bracket and extending from the hook so as to face towards the inner surface of the bracket; and
    a second stopper arranged on the lock body so as to face towards the outer surface of the bracket when the bracket is fastened to the lock body.

8. The steering lock mechanism according to claim 1, wherein the bracket is made of a steel plate.

9. A steering lock mechanism comprising:
    a steering shaft;
    a steering column for accommodating and rotatably supporting the steering shaft;
    a lock body for covering part of the steering column;
    a lock member movably accommodated in the lock body and formed to enable restriction of rotation of the steering shaft;
    a bracket fastened to the lock body so as to cover another part of the steering column, with the bracket and the lock body sandwiching the steering column; and
    a hinged fastening portion for fastening the bracket to the lock body, the hinged fastening portion including:
        a pin;
        a pin support, arranged on the lock body, for supporting the pin, the pin being inserted into the pin support in a partially exposed state;
        a hook arranged on the bracket and hooked to the exposed part of the pin; and
        a stopper, arranged on the bracket or the body, for preventing the hook from being unhooked from the pin,
    wherein the bracket has an outer surface facing away from the steering column, and the stopper is formed to extend from the hook towards the outer surface of the bracket so as to prevent the hook from being unhooked from the pin by abutting against the pin support when torque is applied to the steering shaft while the lock member is restricting rotation of the steering shaft, the stopper including an extension extending from the hook in the axial direction of the pin and being abuttable against the pin support.

* * * * *